(12) United States Patent
Kim

(10) Patent No.: US 6,717,958 B1
(45) Date of Patent: Apr. 6, 2004

(54) VIDEO DATA TRANSMITTING/RECEIVING APPARATUS AND METHOD FOR TRANSMITTING VIDEO DATA IN A FRAME STRUCTURE

(75) Inventor: Dong Uk Kim, Kyongsangbuk-do (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/428,913

(22) Filed: Oct. 28, 1999

(30) Foreign Application Priority Data

Oct. 29, 1998 (KR) .............................. 98-45990

(51) Int. Cl.[7] .................. H04L 7/58; H04L 12/28; H04N 7/36

(52) U.S. Cl. .................. 370/506; 370/471; 375/240.23; 348/423.1; 348/441; 348/469

(58) Field of Search .................. 370/230.1, 230, 370/395, 64, 470, 471, 541, 474, 476, 503, 505, 506; 375/240.01, 289, 240.23, 240.24; 348/423.1, 441, 469

(56) References Cited

U.S. PATENT DOCUMENTS

| | | | |
|---|---|---|---|
| 4,888,768 A | | 12/1989 | Michener .................. 370/102 |
| 5,511,077 A | * | 4/1996 | Shimada |
| 5,708,961 A | * | 1/1998 | Hylton et al. |
| 5,719,872 A | * | 2/1998 | Dubberly et al. |
| 5,740,075 A | * | 4/1998 | Bigham et al. |
| 5,796,723 A | * | 8/1998 | Bencheck et al. |
| 5,825,829 A | * | 10/1998 | Borazjani et al. |
| 5,875,007 A | * | 2/1999 | Zhung et al. |
| 5,956,324 A | * | 9/1999 | Engdahl et al. |
| 6,049,529 A | * | 4/2000 | Brimmage et al. |
| 6,157,659 A | * | 12/2000 | Bird |
| 6,208,666 B1 | * | 3/2001 | Lawrence et al. |
| 6,363,078 B1 | * | 3/2002 | Garcia et al. |
| 6,414,940 B1 | * | 7/2002 | Shah et al. |

FOREIGN PATENT DOCUMENTS

EP 0831600 A1 3/1998

* cited by examiner

*Primary Examiner*—Chi Pham
*Assistant Examiner*—Afsar M. Qureshi
(74) *Attorney, Agent, or Firm*—Fleshner & Kim, LLP (57) ABSTRACT

A DS3 frame structure, video data transmitting/receiving apparatus and method for transmitting and receiving video data can minimize the transmission error during the video data transmission, and can multiplex and transmit two video signals using the DS3 formatted frame. The DS3 frame structure includes a plurality of unit frames each of which includes a frame field for controlling data transmission, an information field of signal data, and a channel coding overhead field for correcting an error in the signal data.

19 Claims, 5 Drawing Sheets

VIDEO DATA TRANSMITTING/RECEIVING APPARATUS AND METHOD FOR TRANSMITTING VIDEO DATA IN A FRAME STRUCTURE

BACKGROUND OF THE INVENTION

1. Field of the Invention

The present invention relates to a frame structure, and in particular to a transmitting/receiving apparatus and method using the frame structure.

2. Background of the Related Art

Generally, in order to achieve an effective data transmission when performing a long-distance data transmission in a wire public communication network, subscriber lines are first digitally multiplexed to determine a local circuit, and then a plurality of local circuits are multiplexed to determine a long-distance circuit. The digital hierarchies are defined by the transmission speeds of the respective stages of the multiplexing, and are in an integer multiple relationship with one another for facilitating the multiplexing. At present, the digital hierarchy is classified into three types, i.e., the U.S. and Canadian hierarchy, the European hierarchy, and the Japanese hierarchy.

Figure 1:
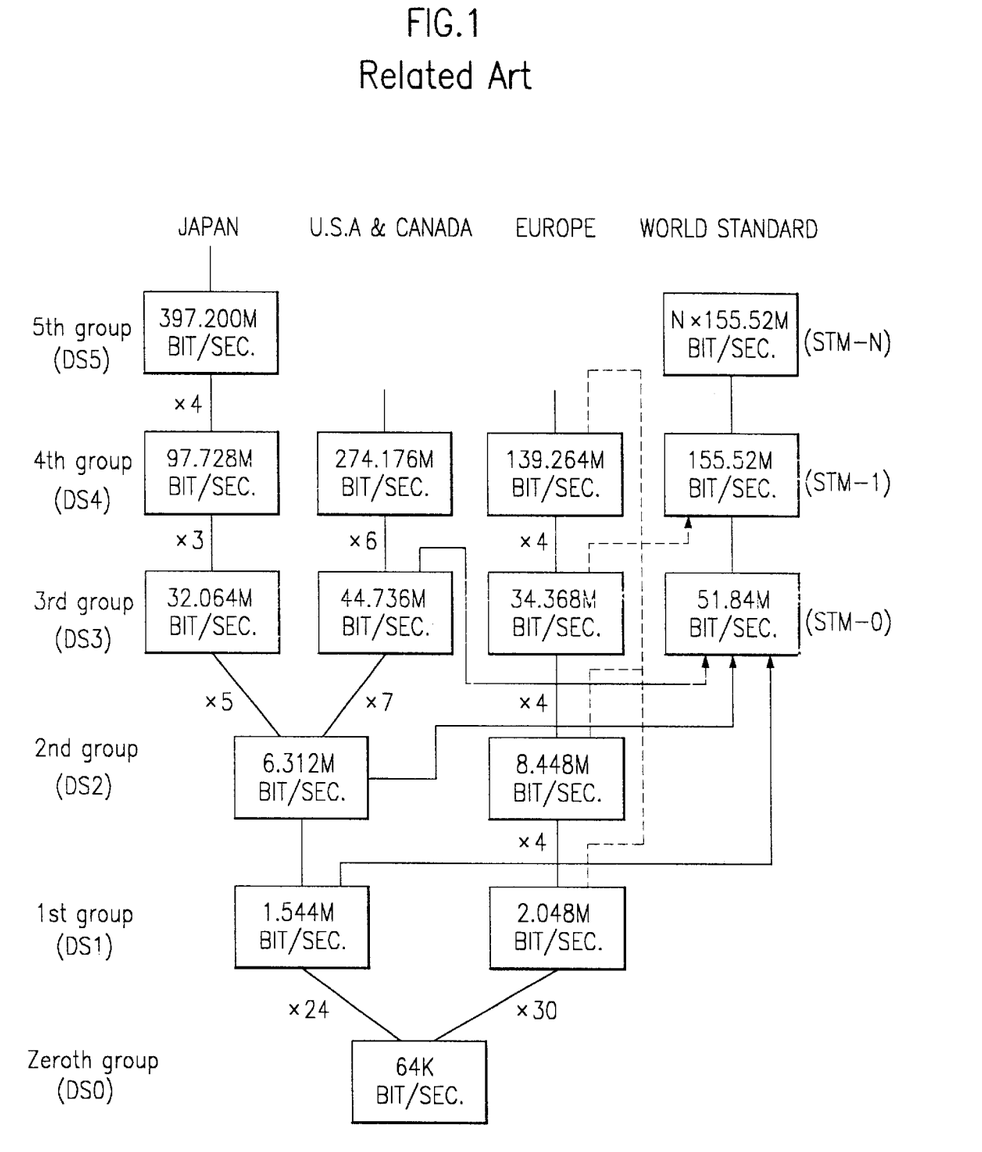
FIG. 1 is a view illustrating the structure of a general digital hierarchy.

As shown in FIG. 1, the U.S. and Canadian digital hierarchy includes DS1, DS2 and DS3 levels. DS1 is a digital hierarchy level having a transmission speed of 1.544 Mbps (megabytes per second), and is called T1. The DS1 includes 193-bit unit frames, and provides 24 channels.

DS2 is a digital hierarchy level wherein four DS1 unit frames are multiplexed. Here, DS2 is not considered part of the digital hierarchy itself, but is only used, as an intermediate hierarchy level, to create DS3 by multiplexing the DS2 unit frames. DS3 is a digital hierarchy level having a transmission speed of 44.736 Mbps, and a unit frame including 680 bits. The DS3 is used for transmitting a digital audio signal and a digital data signal.

As shown in FIG. 1, other digital hierarchy levels following DS3 may be created, for example, by using a frame structure wherein six DS3 unit frames are multiplexed and which has a transmission speed of 274.176 Mbps, or by multiplexing data to be transmitted using a synchronous transport module (STM-0) of the world standard synchronous digital hierarchy (SDH). In addition, other digital hierarchies preceding DS3 may be created. For example, the European hierarchy includes DS1E, which is a digital hierarchy level having a transmission speed of 2.048 Mbps, and is called E1. DS1E includes 256-bit unit frames, and provides 30 channels.

Figure 2:
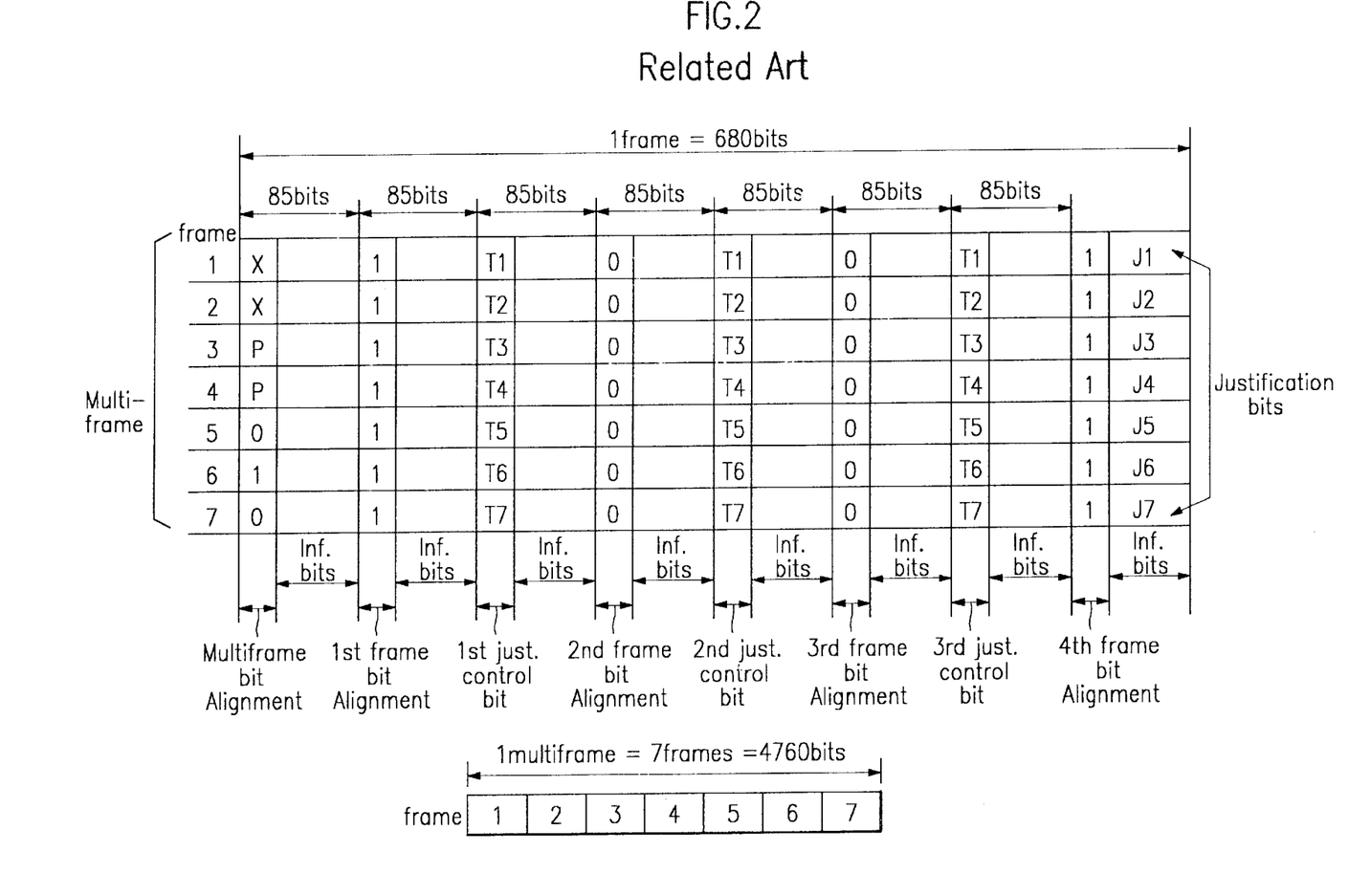
FIG. 2 is a view illustrating the structure of a related DS3 frame structure.

FIG. 2 illustrates a related DS3 frame structure. The DS3 frame of the related digital hierarchy has seven 680-bit unit frames which constitute a multiframe or a superframe having 4,760 (i.e., 680×7) bits. Within the multiframe, 56 bits are used as a frame field, and the remaining 4,704 bits are used as an information field. The DS3 frame is created by multiplexing seven DS2 unit frames, and frame bits are added thereto for enabling the control of transmitted data. Accordingly, the DS3 frame has seven DS2 unit frames and the frame bits added thereto. The number of bits occupied by one DS2 frame with respect to the total number of bits of the DS3 frame is 671.609. (i.e. 4760 bits×6.312 Mbps/44.736 Mbps)

However, in order to make the number of bits occupied by one DS2 frame an integer number, 672 bits are allocated to the DS2 frame, and thus the number of bits occupied by the whole DS3 frame becomes 4,704 (672×7) bits. At this time, since 672 bits instead of 671.609 bits are allocated to a DS2 frame, there is a difference of one bit between them. This one bit may belong to the information field, which serves as a justification bit (J1–J7), as shown in FIG. 2.

Recently, wire communication networks have been replaced with radio communication networks, which use the existing wire networks linked to radio networks. Under such a radio communication environment, a transmission error may easily occur due to an external noise that occurs when transmitting video data carried by a radio frequency using the DS3 frame structure shown in FIG. 2. The transmission error occurs because the existing DS3 frame structure only considers the data transmission based on the wire communication network.

However, the next-generation mobile radio communication system (IMT-2000) is required to provide multimedia services such as image signals, text signals, video signals, etc., as well as audio signals under the radio communication environment. Accordingly, a technique is required for radio-transmitting video signals broadcasted from broadcasting stations to television receivers or mobile terminals, by multiplexing the video signals. However, it is difficult for the DS3 frame structure, as shown in FIG. 2, to support the technique because the transmission speed becomes relatively slow when transmitting a digital television signal having a speed of 19.39 Mbps using the DS2 frame, while the waste in transmission speed becomes relatively large when transmitting the digital television signal using the DS3 frame.

Accordingly, a new digital hierarchy is required to transmit the digital television signal to the television receivers or mobile terminals through the radio communication network. However, this new digital hierarchy runs counter to the existing digital hierarchy based on the related art DS3 frame structure, and the related transmission speeds of the wire communication networks and the radio communication networks. Therefore, it is difficult to use both the new and existing digital hierarchies together.

SUMMARY OF THE INVENTION

An object of the present invention is to at least substantially obviate one or more of the problems due to limitations and disadvantages of the related art and provide at least the advantages set forth below.

Another object of the present invention is to provide an improved DS3 frame structure.

Another object of the present invention is to minimize transmission error during a video data transmission.

Another object of the present invention is to provide a video data transmitting/receiving method.

Another object of the present invention is to multiplex and transmit two video signals using the DS3 frame.

Another object of the present invention is to provide a video interface card.

Objects of the present invention can be achieved, in a whole or in parts, by a DS3 frame structure of a digital hierarchy including a plurality of unit frames, each unit frame having a frame field for controlling data transmission, an information field of signal data, and a channel coding overhead field having correcting data for correcting an error for the data.

Objects of the present invention can also be achieved, in a whole or in parts, by a video signal transmitting apparatus including a television signal line interface for converting at least two input video signals into TTL (transistor-transistor-logic) signals, a DS3 framer for multiplexing the converted video signals outputted from the television signal line interface and framing the multiplexed video signals into a DS3 frame structure, an encoder for inserting channel coding overhead bits into the DS3 frame outputted from the DS3 framer, and a line coder for coding an output of the encoder and transmitting a coded signal.

Objects of the present invention can also be achieved, in a whole or in parts, by a video signal transmitting method including the steps of converting at least two input video signals into TTL (transistor-transistor-logic) signals with a video signal line interface, multiplexing the converted video signals and framing the multiplexed video signals into a DS3 frame structure with a DS3 framer, inserting channel coding overhead bits into the DS3 frame with an encoder, and coding the DS3 frame having the channel coding overhead bits inserted therein and transmitting the coded DS3 frame with a line coder.

Objects of the present invention can also be achieved, in a whole or in parts, by a video signal receiving method including the steps of receiving video signals multiplexed to a DS3 frame and converting the video signals into TTL (transistor-transistor-logic) signals with a line interface, extracting original video signals from the DS3 frame with a DS3 deframer, compensating for or correcting a transmission error included in the DS3 frame with a decoder, and line-coding the compensated or corrected video signals to transmit the compensated or corrected video signals with a phase encoder.

Objects of the present invention can also be achieved, in a whole or in parts, by a video interface card using the DS3 frame structure of a digital hierarchy having a frame field, an information field, and a channel coding overhead field.

According to the above aspects of the present invention, two video signals can be multiplexed, and transmitted on a radio frequency with the basic structure of the related digital hierarchy, and the transmission error can be greatly reduced during the video data transmission.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
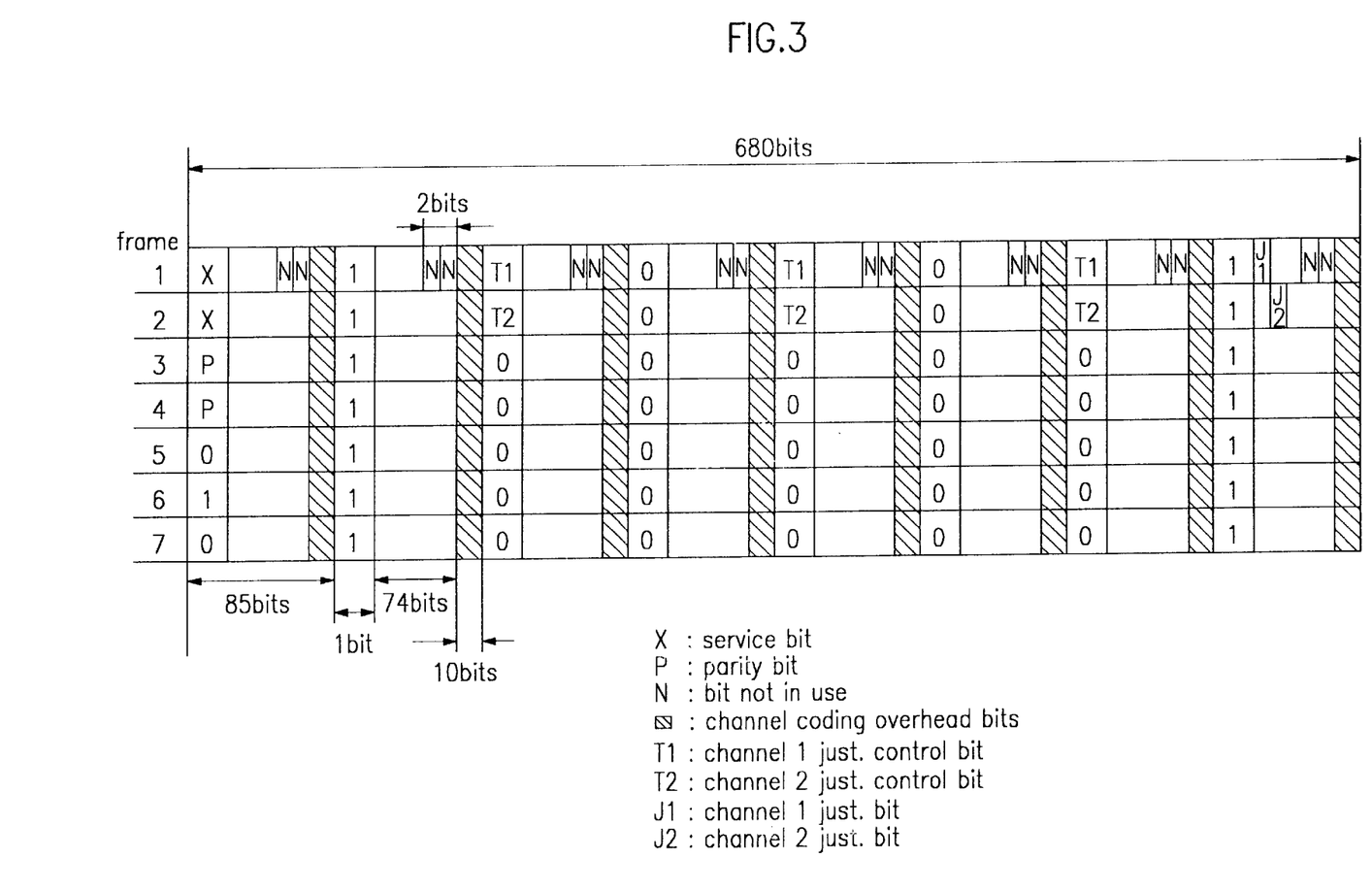
FIG. 3 is a view illustrating the DS3 frame structure according to a preferred embodiment of the present invention.

FIG. 3 illustrates the DS3 frame structure according to a preferred embodiment of the present invention, which includes seven 680 bit unit frames. Each unit frame includes frame bits for controlling data transmission, information bits for transmitting two digital television signals at a speed of 19.39 Mbps, and channel coding overhead bits for correcting errors in the information bits. Also, each unit frame has eight groups of 85 bit sections. Here, the first bit of each section is the frame bit, the 2nd to 75th bits are the information bits, and 76th to 85th bits are the channel coding overhead bits.

The DS3 frame has a bit ratio of 44.736 Mbps, and the digital television signal has a bit ratio of 19.39 Mbps. Since 19.39 Mbps×2=38.78 Mbps, and 19.39 Mbps×3=58.17 Mbps, two digital television signals can be rated as one signal source, and thus can be multiplexed using the DS3 frame. Therefore, in this example, the DS3 frame includes two digital television signals.

According to a preferred embodiment of the present invention, the DS3 frame includes 4760 (7×680) bits, and each unit frame includes 56 bits that are similar to the related DS3 frame. Here, the 56 bits are used as the frame field. In the DS3 frame structure, the number of bits occupied by one digital television signal, with respect to the total number of bits of the DS3 frame, is 2063.135 (4760 bits×(19.39 Mbps/44.736 Mbps). However, in order to make the number of bits occupied by one digital television signal an integer number, 2064 bits are allocated to one digital television signal. Accordingly, since the DS3 frame multiplexes the two digital television signals, the total number of information bits becomes 4128 (e.g., 2064×2) bits. The DS3 frame of the preferred embodiment, includes 560 bits used as channel coding overhead bits, as determined by subtracting the number of frame bits (e.g., 56 bits), the number of information bits (e.g., 4128 bits), and the number of surplus bits (e.g., 16 bits), from the total number of bits (e.g., 4760 bits).

Here, the frame bits may include some multiframe alignment bits and frame alignment bits of the related DS3 frame field, such as a service bit X, a parity bit P, a channel 1 justification control bit T1, and a channel 2 justification control bit T2. The service bit X satisfies the service conditions required for transmitting the DS3 frame, and the parity bit P is used to indicate an error, which may occur during the transmission.

According to the related DS3 frame structure, since seven DS2 frames are multiplexed and the number of channels is seven, then seven channel justification control bits T1 to T7 and seven justification bits J1 to J7 are required. According to the DS3 frame structure of the preferred embodiment of the present invention, since the digital television signals of two channels are multiplexed, then two channel justification control bits T1 and T2 and two justification bits J1 and J2 are used as the frame bits. The channel justification bits J1 and J2 can be used for either justification with data transmission or justification without data transmission.

In this example of the preferred embodiment, as shown in FIG. 3, three channel 1 justification control bits T1 and three channel 2 justification control bits T2 indicate whether the justification bits J1 and J2 are used for data transmission or for justification only. For example, if the values of the justification control bits T1 and T2 are all 0, then the justification bits J1 and J2 are used for justification only. If the values of the justification control bits T1 and T2 are all 1, then the justification bits J1 and J2 are used for the data transmission.

The channel coding overhead bits, illustrated as slanting lines in FIG. 3, are used to protect the information bits from the external noise when the digital television signals are multiplexed to the DS3 frame and then transmitted while being carried on a radio frequency. Specifically, the channel coding overhead bits encode the digital television signals using a Reed-Solomon (17,15) (RS (17,15)) coding method. According to the RS (17,15) coding method, 15 symbols among 17 symbols, of which each symbol includes 5 bits, are encoded with the information bits, and the remaining two symbols are encoded with the channel coding overhead bits. At least one of the two symbols of the channel coding overhead bits can be corrected. Hence, if a symbol comprises 5 bits, a maximum of 5 bits can be corrected.

The ratio of the information bits to the channel coding overhead bits, as shown in FIG. 3, is 75 bits to 10 bits. Here, the 17 and 15 symbols of the RS (17,15) coding method are obtained by calculating (75 bits+10 bits)/5 bits=17, and 75 bits/5 bits=15, respectively.

In this example of the preferred embodiment, the surplus 16bits of the DS3 frame are reserved as spare bits. The digital television signal is generally transmitted in a unidirectional communication method, but a bidirectional communication method may possibly be used in transmitting the digital television signal. Then the surplus 16 bits of the DS3 frame will be available for the transmission, service or monitoring of the bidirectional communication.

Figure 4:
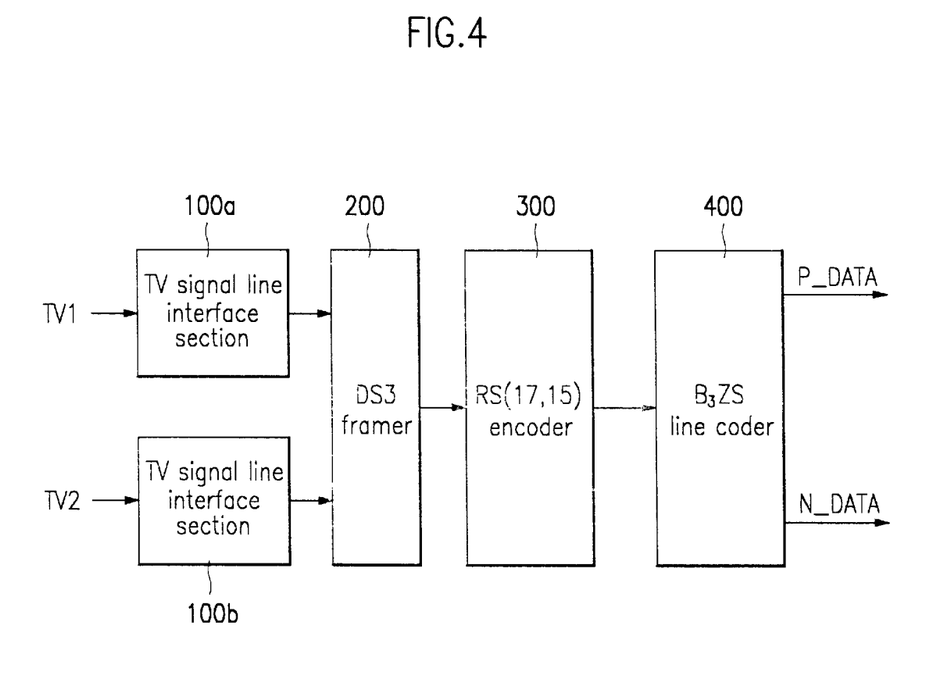
FIG. 4 is a block diagram of a preferred embodiment of the digital television signal transmitting apparatus.

FIG. 4 is a block diagram of the digital television signal transmitting apparatus, using the DS3 frame, according to a preferred embodiment of the present invention. Referring to FIG. 4, the digital signal transmitting apparatus includes television signal line interface sections 100a and 100b that convert two input digital television signals TV1 and TV2 into TTL (transistor-transistor-logic) signals, and a DS3 framer 200 that multiplexes the converted digital television signals outputted from the television signal line interface sections 100a and 100b, and frames the multiplexed video signals to a DS3 frame structure of about 44.736 Mbps. The digital signal transmitting apparatus shown in FIG. 4 also includes an RS encoder 300 that inserts channel coding overhead bits into the DS3 frame outputted from the DS3 framer 200 using an RS (17, 15) coding method, and a line coder 400 that codes an output of the RS encoder 300 to positive and negative signals using an encoding method, such as a $B_3ZS$ encoding method, to transmit the positive and negative signals.

The digital television signal transmitting apparatus of a preferred embodiment broadcasts video information in the form of a digital television signal, which is produced by a broadcasting station, to a specified region. Referring to FIG. 4, the two kinds of digital television signals TV1 and TV2, which are preferably transmitted from a broadcasting station through a cable, are inputted to the television signal line interface sections 100a and 100b, respectively, for conversion to TTL signals. The TTL-converted digital television signals are inputted to the DS3 framer 200, and the frame bits and information bits, of a DS3 frame of the preferred embodiments, are encoded so that the digital television signals are formatted in the DS3 frame structure. The RS encoder 300 receives the frame bits and information bits of the DS3 frame outputted from the DS3 framer 200, and inserts the channel coding overhead bits into the DS3 frame, for protecting the information bits and correcting transmission errors that may occur during the radio transmission. Thereafter, the line coder 400 receives the digital television signal multiplexed to the DS3 frame and outputted from the RS encoder 300, and $B_3ZS$-encodes the received digital television signal to separate it into positive data P_DATA, and negative data N_DATA, for subsequent broadcast.

However, the broadcasting of the digital television signal is actually subject to regional restrictions. Since the propagation distance of the radio waves broadcast by the digital television signal transmitting apparatus, shown in FIG. 4, is about tens of kilometers (km), the radio waves cannot reach a more remote city or region located a greater distance from the digital television signal transmitting apparatus. Accordingly, a subscriber transmitting apparatus may be provided between remote regions to enable long-distance radio transmission of the television signal. The subscriber transmitting apparatus is classified into a radio frequency type and an optical type, such as an optical type fiber loop carrier (FLC). A DS3 unit or a video interface unit, for example, as described below, should be provided on the subscriber transmitting apparatus.

Figure 5:
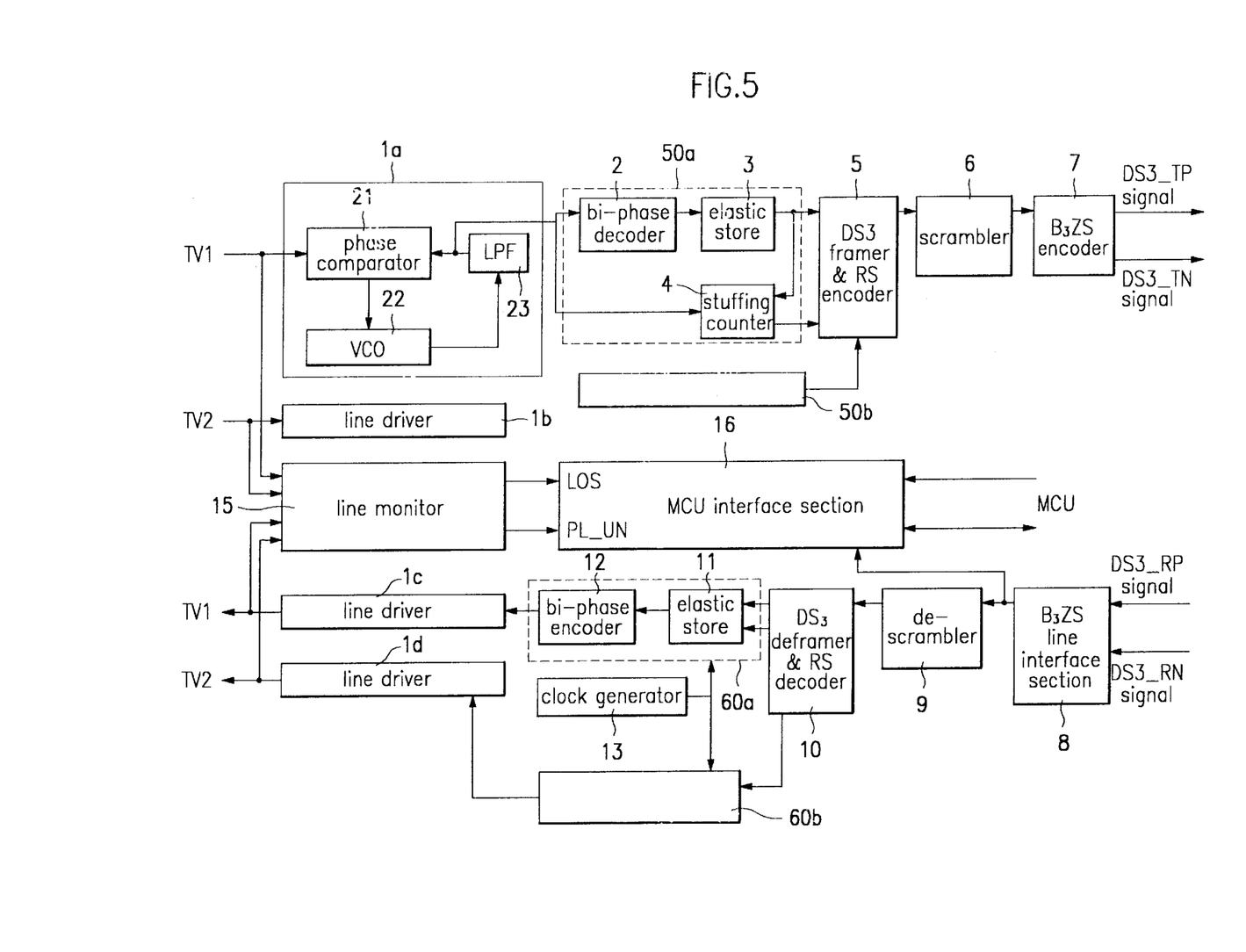
FIG. 5 is a block diagram of a preferred embodiment of video interface card.

FIG. 5 is a block diagram of a video interface unit using the improved DS3 frame structure, according to a preferred embodiment of the present invention. The video interface unit provides at least one of the subscriber transmitting apparatus the capability to perform long-distance radio transmission of the television signal and bidirectional communication.

Referring to FIG. 5, the video interface unit includes a line driver 1a–1d that extracts frequency signals from input television signals. Components 50a and 50b each includes a bi-phase decoder 2 that converts an output signal of the line driver 1a–1d to a TTL signal, an elastic store 3 and a stuffing counter 4 that attenuates jitter included in an output of the bi-phase decoder 2. Although components 50a and 50b are shown as separate elements, they can be integrated. A DS3 framer and RS encoder 5 that frames the television signal outputted from the elastic store 3 and the stuffing counter 4 to a DS3 frame, and that inserts channel coding overhead bits into the DS3 frame, by the RS coding method.

The video interface unit, shown in FIG. 5, also includes a scrambler 6 that scrambles an output of the DS3 framer and RS encoder 5 to compensate for a white noise. A $B_3ZS$ encoder 7 separates an output of the scrambler 6 into positive data (DS3_TP) and negative data (DS3_TN) by encoding the output signal of the scrambler 6 by a $B_3ZS$ coding method and broadcasts the positive and negative data. A $B_3ZS$ line interface section 8 receives and converts the input positive data (DS3_RP) and negative data (DS3_RN) into a TTL signal. A descrambler 9 descrambles an output signal of the $B_3ZS$ line interface section 8. A DS3 deframer and RS decoder 10 extract the original television signals from the DS3 frame outputted from the descrambler 9, and compensates for the error included in the DS3 frame. Components 60a and 60b each includes an elastic store 11 that attenuates jitter included in output signals of the DS3 deframer and RS decoder 10, and a bi-phase encoder 12 that line-codes an output of the elastic store 11. Although components 60a and 60b are shown as separate elements, they can be integrated.

The example of a video interface unit shown in FIG. 5 further includes a clock generator 13 that provides a main clock signal of 38.78 MHZ to the elastic store 11. A line driver 14 transmits the television signals outputted from the bi-phase encoder 12 to a transmission cable. A line monitor 15 monitors the digital television signals TV1 and TV2 input to and output from the line drivers 1a to 1d. A microcontrol unit (MCU) interface section 16 is connected to the line monitor 15, for communicating with a microcontrol unit (MCU).

The transmitting and receiving operation of the video interface unit as shown in FIG. 5 will now be explained as it relates to the first digital television signal TV1. The transmitting and receiving operation of the video interface unit for the second digital television signal TV2 is substantially similar and is not included for brevity. However, one of ordinary skill in the art would readily understand the transmitting and receiving operation for the second digital television signal TV2 from the description of the transmitting and receiving operation for the first digital television signal TV1.

Regarding the digital television signal transmitting operation of the video interface unit, the line drivers 1a receives digital television signal TV1 having a speed of 19.39 Mbps and extracts the frequency of 38.78 MHZ therefrom. As shown in FIG. 5, the line driver 1a comprises a phase-locked loop including a phase comparator 21, a voltage controlled oscillator (VCO) 22, and a low pass filter (LPF) 23. The line driver la detects a state of no signal or PLL unlock. The bi-phase decoder 2 converts the output of the line driver 1a to a TTL signal to provide a bi-phase code of the output signal of the line driver 1a. The elastic store 3 and the stuffing counter 4 compensate for the remainder decimal bits of the digital television signals produced when the digital television signals outputted from the bi-phase decoder 2 are multiplexed. For instance, the number of bits allocated to one DS3 frame for one channel of the television signal is 4760×19.39/44.736=2063.13. The remainder decimal bit, i.e., 0.13 bit, is compensated for by the elastic store 3 and the stuffing counter 4.

The digital television signal input from the elastic store 3 and the stuffing counter 4 to the DS3 framer and RS encoder 5 is reformatted to the DS3 frame structure with frame bits, information bits, and channel coding overhead bits. The DS3 framer and RS encoder 5 RS-encode the digital television signals to compensate for transmission error that may occur during the data transmission. The digital television signals outputted from the DS3 framer and RS encoder 5 are inputted to the scrambler 6 to be scrambled to compensate for white noise. The output of the scrambler 6 is inputted to the $B_3ZS$ encoder 7, and encoded by the $B_3ZS$ encoding method for separation of the scrambled signal to a positive signal DS3_TP and a negative signal DS3_TN, which are the standard line codes for the transmission of the DS3 frame. Then, the positive and negative signals are transmitted to an ASIC for processing the DS3 frame.

Regarding the digital television signal receiving operation of the video interface unit, the DS3 positive signal DS3_RP and negative signal DS3_RN transmitted from the digital television signal transmitting apparatus are inputted and converted to TTL signals by the $B_3ZS$ line interface section 8. The descrambler 9 descrambles the output signal of the $B_3ZS$ line interface section 8, and transfers the descrambled signal to the DS3 deframer and RS decoder 10. The DS3 deframer and RS decoder 10 extracts the original television signal from the DS3 frame, compensates for transmission errors included in the DS3 frame, and transfers the error-compensated television signal to the elastic store 11.

The elastic store 11 receives a 38.78 MHZ clock signal from the clock generator 13, attenuates jitter included in the descrambled television signal received by the DS3 deframer and RS decoder 10, and transfers the jitter-attenuated television signal to the bi-phase encoder 12. The bi-phase encoder 12 line-codes the output TTL signal of the elastic store 11, and transmits the line-coded television signal to the transmission cable through the line driver 1c. At this time, the television signal input to and output from the line drivers 1a and 1c are monitored through the line monitor 15, and the line monitor 15 can communicate with the MCU through the MCU interface section 16 for the control of the television signal receiving operation.

As described above, according to the preferred embodiments of the present invention, the digital television signals can be transmitted by multiplexing them using the improved DS3 frame structure, including the channel coding overhead bits for protecting the frame bits, and information bits of the related digital hierarchy. Therefore, the transmission error of the information bits can be greatly reduced as the error can be corrected, thereby enabling effective radio transmission of the digital television signals.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A frame structure having a plurality of unit frames, each unit frame comprising:

a frame field including a frame bit that controls data transmission;

an information field including information bits of digital video signal data; and a channel coding overhead field including channel coding overhead bits having correcting data to correct an error in the digital video signal data, wherein the plurality of unit frames form a multi-frame used to multiplex digital video signals of at least two channels, the multi-frame having a size of 4760 bits and each unit frame having a size of 680 bits, and wherein each unit frame includes eight groups of 85 bits, and wherein a first bit of each group is allocated as the frame bit, a $2^{nd}$ bit to a $75^{th}$ bit of each group are allocated as the information bits, and a $76^{th}$ bit to an $85^{th}$ bit of each group are allocated as the channel coding overhead bits.

2. The frame structure of claim 1, wherein the multi-frame is a DS3 formatted frame, and the frame structure is a DS3 frame structure.

3. The frame structure of claim 1, wherein each of the unit frames includes a plurality of subunit frames, and portions of the frame field, the information field, and the channel coding overhead field are allocated to each subunit frame.

4. The frame structure of claim 3, wherein the frame field includes a service bit that satisfies a condition for transmitting the multi-frame, a parity bit that indicates an error occurring during a transmission of the multi-frame, and one of a frame alignment bit and a channel justification control bit, that controls a channel justification bit for one of the video signals.

5. The frame structure of claim 4, wherein the channel justification control bit indicates a type of a corresponding one of the channels of the video signals being multiplexed.

6. The frame structure of claim 4, wherein the frame alignment bit is allocated to every other subunit frame.

7. The frame structure of claim 4, wherein the channel justification bit indicates one of a data transmission and a justification of the multi-frame, and the channel justification bit is allocated to a predetermined position of the information field.

8. The frame structure of claim 7, wherein the channel justification control bit initiates a type of a corresponding one of the channels of the video signals being multiplexed.

9. The frame structure as recited in claim 1, wherein at least one of the unit frames includes a predetermined number of bits not in use, that are allocated to predetermined positions of the information bits.

10. A DS3 frame structure having a plurality of unit frames, each unit frame comprising:
a frame field including:
  a) at least one frame bit that controls data transmission,
  b) a number of justification bits, and
  c) a number of justification control bits which determine whether the justification bits are used for data transmission or justification only;
an information field including bits of at least two digital video signals; and
a channel coding overhead field including channel coding overhead bits for correcting error in at least one of the digital video signals.

11. A transmitting apparatus, comprising:
a signal line interface that converts at least two input video signals into prescribed logic level signals;
a framer that multiplexes the converted video signals output from the signal line interface, and that frames the multiplexed video signals to a DS3 formatted frame;
an encoder that inserts a plurality of channel coding overhead bits into the DS3 formatted frame output from the framer; and
a line coder that codes an output of the encoder, and that transmits a coded DS3 formatted frame signal, wherein the signal line interface includes a line driver that receives the input video signals having a first frequency and extracts a second frequency therefrom at a rate equal to the first frequency times a number of the input video signals.

12. The transmitting apparatus of claim 11, further comprising:
a compensation unit to compensate for an undesired system noise in the DS3 formatted frame output from the encoder.

13. The transmitting apparatus of claim 11, wherein the signal line interface further includes a decoder that converts an output of the line driver to the prescribed logic level signals, and a store/counter section that compensates for a remainder decimal bit of the prescribed logic level signals.

14. A method for transmitting video signals, comprising:
converting at least two input video signals into prescribed logic level signals;
multiplexing the converted video signals, and framing the multiplexed video signals into a DS3 formatted frame having a plurality of unit frames formed in a multi-frame, said multi-frame having a size of 4760 bits and each unit frame having a size of 680 bits;
inserting channel coding overhead bits into the DS3 formatted frame; and
coding the DS3 formatted frame, having the channel coding overhead bits inserted therein, and transmitting the coded DS3 formatted frame, wherein each unit frame includes eight groups of 85 bits and wherein a first bit of each group is allocated as a frame bit, a $2^{nd}$ to $75^{th}$ bit of each group are allocated as information bits, and a $76^{th}$ bit to an $85^{th}$ bit of each group are allocated as the channel coding overhead bits.

15. A method for transmitting video signals, comprising:
converting at least two input video signals into prescribed logic level signals;
multiplexing the converted video signals and framing the multiplexed video signals into a DS3 formatted frame;
inserting channel coding overhead bits into the DS3 formatted frame; and
coding the DS3 formatted frame having the channel coding overhead bits inserted therein and transmitting the coded DS3 formatted frame, wherein the DS3 formatted frame includes:
a frame field including:
  a) at least one frame bit for controlling data transmission,
  b) a number of justification bits, and
  c) a number of justification control bits which determine whether the justification bits are used for data transmission or justification only,
an information field of signal data, and
the channel coding overhead bits for correcting error in the signal data.

16. A method for receiving video signals, comprising:
receiving video signals multiplexed to a DS3 formatted frame having a plurality of unit frames formed in a multi-frame, said multi-frame having a size of 4760 bits and each unit frame having a size of 680 bit and including eight groups of 85 bits, wherein a first bit of each group is allocated as a frame bit, a $2^{nd}$ to $75^{th}$ bit of each group are allocated as information bits, and a $76^{th}$ bit to an $85^{th}$ bit of each group are allocated as the channel coding overhead bits;
converting the video signals to prescribed logic level signals;
extracting original video signals from the DS3 formatted frame;
compensating for a transmission error; in the original video signals included in the DS3 formatted frame; and
line-coding the compensated original video signals to transmit the compensated original video signals.

17. The method of claim 16, further comprising separating the compensated original video signals into at least two output video signals.

18. A receiving apparatus, comprising:
a line interface that receives video signals multiplexed to a DS3 formatted frame having a plurality of unit frames formed in a multi-frame, said multi-frame having a size of 4760 bits and each unit frame having a size of 680 bit and including eight groups of 85 bits, wherein a first bit of each group is allocated as a frame bit, a $2^{nd}$ to $75^{th}$ bit of each group are allocated as information bits, and a $76^{th}$ bit to an $85^{th}$ bit of each group are allocated as the channel coding overhead bits, said line interface converting the video signals into prescribed logic level signals;
a deframer that extracts original video signals from the DS3 formatted frame;
a decoder that decodes the extracted original video signals to compensate for a transmission error in the DS3 formatted frame;
a phase encoder that codes the compensated original video signals; and
a line driver that separates the compensated original video signals into at least two output video signals.

19. The receiving apparatus of claim 18, further comprising a descrambler that descrambles the prescribed logic level signals output from the line interface.

* * * * *